March 24, 1942.         J. T. CASSELL         2,277,071
SLOPE LEVEL
Filed June 17, 1941

INVENTOR
JAMES T. CASSELL
BY
ATTORNEYS

Patented Mar. 24, 1942

2,277,071

UNITED STATES PATENT OFFICE 2,277,071

SLOPE LEVEL

James T. Cassell, Oroville, Calif.

Application June 17, 1941, Serial No. 398,443

1 Claim. (Cl. 33—213)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government of the United States of America for governmental purposes without the payment to me of any royalty thereon.

The purpose of my invention is to provide a slope level which may be attached to a slope board and then quickly adjusted and positively locked so that the slope board will indicate any desired slope in common use on highway, earth dam or canal construction.

Current construction practice requires the accurate dressing of cuts and embankments to a multiplicity of slopes. This has necessitated the use by workmen of a separate slope board with a fixed level for each of the various slopes with consequent inefficiency and increased error. The checking of slopes by inspectors has entailed the use of a 2-man or 3-man tape-and-level party. The slope level hereinafter described enables even an unskilled workman to make a rapid, accurate and positive setting of a slope board to any of the various slope in common construction use and obviates the need for a large number of slope boards on a single job. One inspector, using this instrument, can determine the accuracy of any constructed slope in a fraction of the time required by a tape-and-level party.

Figure 1:
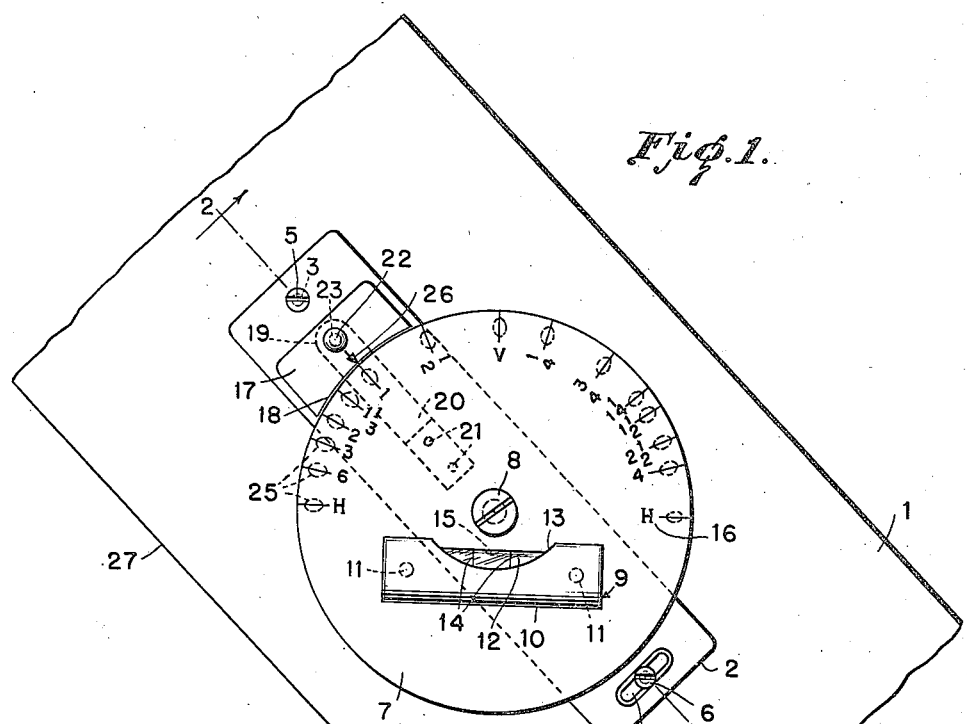
Figure 2:
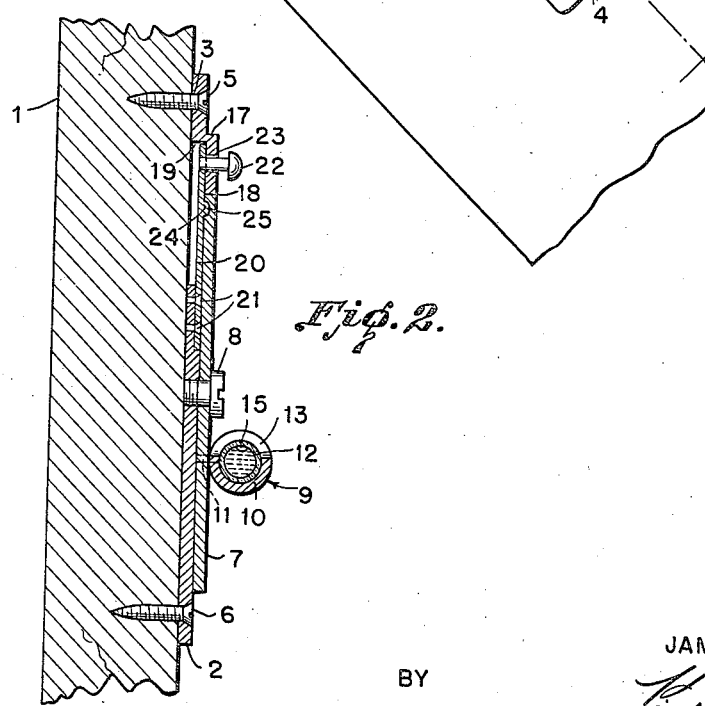

My invention is illustrated in the accompanying drawing, in which Figure 1 is a front elevation of the device showing it attached to a slope board; and Figure 2 is a section along line 2—2 of Figure 1.

In carrying out my invention I make use of a slope board indicated generally at 1. This slope board is usually about eight feet in length, four inches wide, and one inch thick, but these dimensions may be varied considerably without effecting the efficacy of the instrument. On the slope board I mount a plate 2, which constitutes a supporting base for the device. The plate 2 has an opening 3 at one end and an arcuate slot 4 at the other, the center of which arc is the center of the opening 3. Screws 5 and 6 are mounted in the opening 3 and in the arcuate slot 4 and secure the base 2 to the slope board 1 in the desired position. The purpose of the arcuate slot 4 is to permit slight adjustment of the base 2 into proper position with respect to the board if necessary.

I provide a disc 7 and rotatably secure this disc to the base 2 by a screw 8 or other suitable fastening means. The disc carries a spirit level indicated generally at 9 and Figure 1 shows this spirit level comprising a casing 10 which is secured to the disc by pins 11 or other suitable fastening means. The casing houses a glass tube 12. The casing 10 is cut away at 13 to expose a portion of the glass tube and the tube carries centering marks 14. The tube is filled with a liquid in the usual manner to a point where only a bubble of air indicated at 15 remains. When this bubble is disposed between the lines 14—14 the device is in the proper position.

The front face of the disc 7 is provided with a number of markings indicated generally at 16 and these represent different angles of slope. The markings associated with the letter H refer to a horizontal position of the slope board. Midway between the two markings H there is a marking designated by V which represents a vertical position of the board. From the mark V to the right-hand mark H, I arrange the following slope indicating ratios: ¼:1, ¾:1, 1¼:1, 1½:1, 2½:1, and 4:1. From the mark V to the left-hand mark H, I arrange the following slope indicating ratios: ½:1, 1:1, 1⅓:1, 2:1, 3:1, and 6:1. It is obvious that other markings may be used and I do not wish to be confined to those shown.

It is further obvious that the markings shown may be disposed in only one-quarter of the circle of the disc, rather than in one-half of the circle. By disposing the markings in a half circle, however, the numbers may be made larger and therefore be more easily read. It will be further noted that since the ratio is always a fraction or a number "is to the number 1," the final number 1 is left off the disc and only the fractions—or whole numbers and fractions—appear. This is done to make the device more readable.

The base 2 carries a raised portion 17 and this portion has an arcuate edge 18 that is disposed adjacent to the periphery of the disc 7. Figure 2 shows the base 2 provided with a slot 19, in which a leaf spring 20 is disposed. This leaf spring 20 is secured to the base by rivets 21 or other suitable fastening means. A push button 22 impinges on the free end of the spring and has its shank slidably mounted in an opening 23 in the raised portion 17. The leaf spring 20 carries a projection 24 that is designed to enter any one of a number of recesses 25 provided in the under surface of the disc 7. Figure 1 shows the recesses 25 disposed beneath each marking 16. The recesses are elongated and so is likewise the projection 24. The raised portion 17 carries a marker 26 that extends to the edge 18 and any one of the markings 16 may be brought into registration with the marking 26. The projection 24 will hold the disc against rotation when it enters any one of the recesses 25.

From the foregoing description of the various parts of the device the operation thereof may readily be understood.

In operation the device is attached to the slope board in the manner shown and when it is desired to use the slope board, the disc 7 is rotated by means of the casing 10 to bring the desired slope ratio number into registration with the mark 26. During the rotation of the disc 7, the push button 22 is kept depressed to free the projection 24 from the recesses 25 and permit the disc to be rotated. When the disc is turned into the desired position the push button is released and this will cause the projection 24 to enter the recess 25 disposed adjacent to the mark 26 and to lock the disc against further rotation.

Figure 1 shows the disc set at a ratio of 1:1. An edge 27 of the board 1 is placed against the slope of a wall, cut, or embankment and when the bubble 15 becomes centered between the markings 14, then the operator knows that the edge 27 is inclined at the desired 1:1 ratio.

While I have shown only the preferred form of my invention, it should be understood that various changes or modifications may be made within the scope of the appended claim without departing from the spirit of the invention.

Having thus described my invention, I claim:

A slope level comprising a base, a disc rotatably carried by the base and having slope indicating marks thereon with a recess associated with each mark, said base having a projection with an arcuate edge coinciding with the disc periphery, a leaf spring carried by the base and carrying a projection designed to enter any one of the recesses for locking the disc against rotation, and a push button for moving the spring and freeing the projection from a recess.

JAMES T. CASSELL.